US 10,981,620 B2

(12) United States Patent
Alfano

(10) Patent No.: US 10,981,620 B2
(45) Date of Patent: Apr. 20, 2021

(54) CYCLE-TYPE VEHICLE SUSPENSION PROVIDED WITH A RESILIENT ELEMENT FOR MAKING IT POSSIBLE TO OBTAIN AN OPTIMAL STATIC COMPRESSION CURVE, AND OPTIMIZED RESILIENT ELEMENT FOR SUCH SUSPENSION

(71) Applicant: M-otion Engineering, Villefranche sur Saone (FR)

(72) Inventor: Matthieu Alfano, Fareins (FR)

(73) Assignee: M-otion Engineering, Villefranche sur Saone (FR)

( * ) Notice: Subject to any disclaimer, the term of this patent is extended or adjusted under 35 U.S.C. 154(b) by 249 days.

(21) Appl. No.: 15/738,493

(22) PCT Filed: Jun. 24, 2016

(86) PCT No.: PCT/FR2016/051560
§ 371 (c)(1),
(2) Date: Dec. 20, 2017

(87) PCT Pub. No.: WO2016/207570
PCT Pub. Date: Dec. 29, 2016

(65) Prior Publication Data
US 2019/0084642 A1    Mar. 21, 2019

(30) Foreign Application Priority Data

Jun. 25, 2015    (FR) .................................... 1555850

(51) Int. Cl.
*B62K 25/28*        (2006.01)
*B60G 11/02*        (2006.01)
(Continued)

(52) U.S. Cl.
CPC .............. *B62K 25/28* (2013.01); *B60G 11/02* (2013.01); *B62K 25/12* (2013.01); *F16F 1/18* (2013.01);
(Continued)

(58) Field of Classification Search
CPC ................................ B62K 25/28; B62K 25/12
See application file for complete search history.

(56) References Cited

U.S. PATENT DOCUMENTS 1,745,963 A * 2/1930 Trouche ................. B62K 25/04
280/283
4,763,885 A * 8/1988 Zamitter ................ B60G 11/00
267/158

FOREIGN PATENT DOCUMENTS

DE        1297489 B        6/1969
EP        0394438 A1       10/1990
(Continued)

OTHER PUBLICATIONS

International Search Report for International Application No. PCT/FR2016/051560 dated Jun. 1, 2017, 3 pages.
(Continued)

*Primary Examiner* — Kevin Hurley
(74) *Attorney, Agent, or Firm* — TraskBritt

(57) ABSTRACT

A vehicle wheel suspension system includes two relatively movable portions and a resilient blade that includes two means for mechanical connection to both relatively movable portions, respectively. The blade has a flexural resilience at least 100 times greater than the tensile resilience, and is resiliently deformable between: a resting state in which the blade has an inwardly curved profile, and a maximally extended state in which the blade has an elongate profile, the length of which corresponds to that of the neutral fiber of the blade, while passing through intermediate extension states in which the blade has profiles that are less and less inwardly
(Continued)

curved. The suspension system is deformable between an initial state in which the relatively movable portions are in a close configuration, and a compressed state in which the relatively movable portions are in a separated configuration and bias the blade.

15 Claims, 6 Drawing Sheets

(51) Int. Cl.
*F16F 1/18* (2006.01)
*B62K 25/12* (2006.01)

(52) U.S. Cl.
CPC .... *B60G 2202/116* (2013.01); *B62K 2201/06* (2013.01)

(56) References Cited

FOREIGN PATENT DOCUMENTS

| | | |
|---|---|---|
| EP | 2792587 A1 | 10/2014 |
| FR | 624582 A | 7/1927 |
| FR | 2475171 A1 | 8/1981 |
| FR | 2986844 A1 | 8/2013 |
| FR | 3004415 | 10/2014 |

OTHER PUBLICATIONS

International Written Opinion for International Application No. PCT/FR2016/051560 dated Jun. 1, 2017, 6 pages.

* cited by examiner

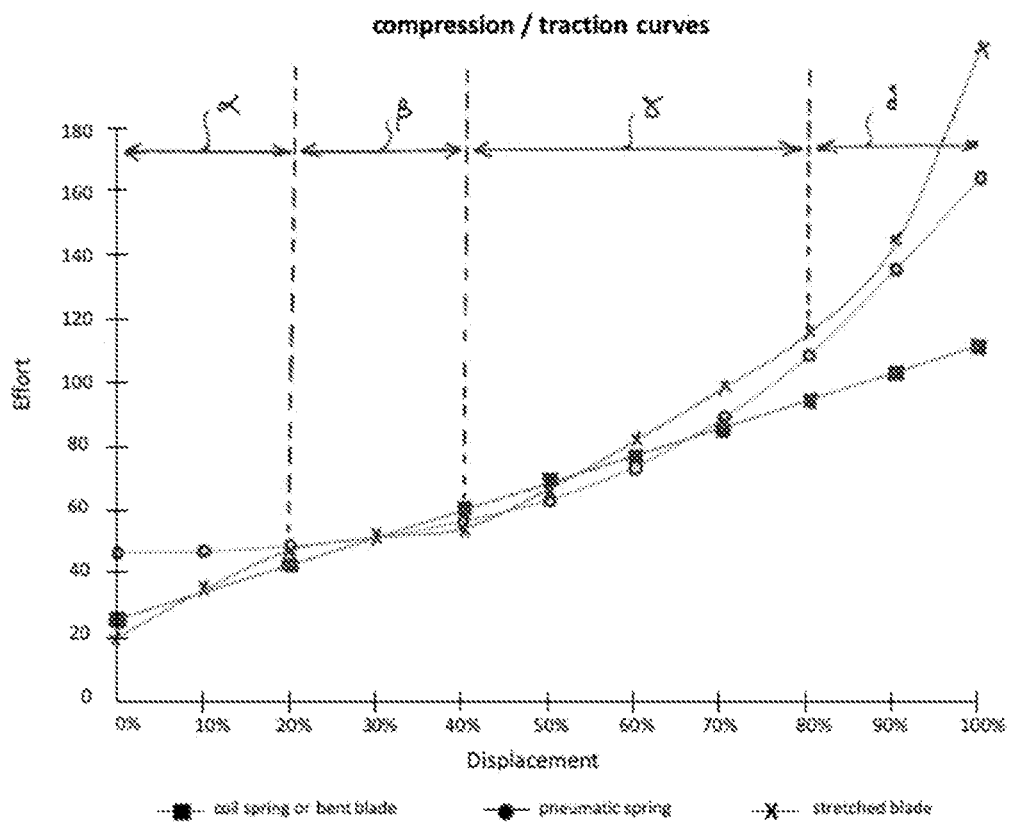
FIG. 1
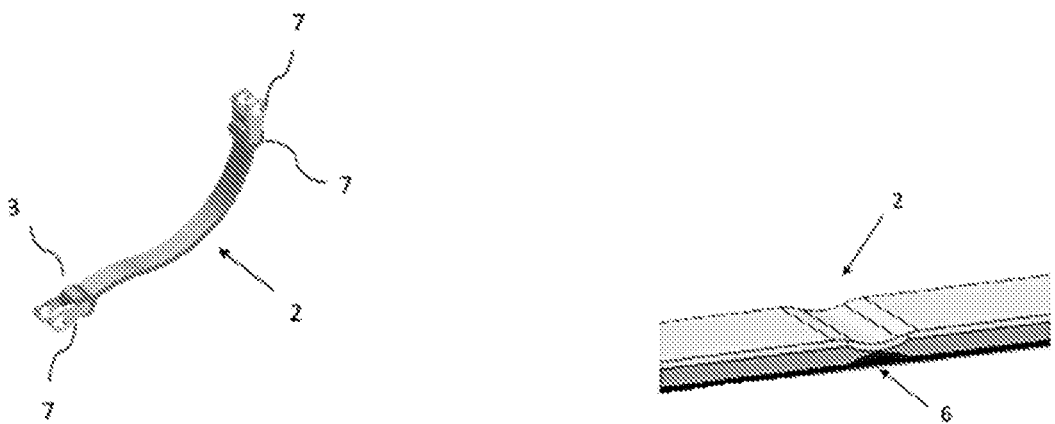
FIG. 2            FIG. 3

| Type of resilient element | Advantage | Disadvantage |
|---|---|---|
| Coil spring and bent blades | - Good sensitivity (0%)<br>- Linear compression (0-100%) | bumping (100%) |
| Coil spring | - No bumping (100%) | Little sensitive - (0 %) |
| Stretched blade (example of a possible curve) | - Very sensitive (0%)<br>- "horizontal" about the balance position (30%)<br>- Linear in the operation area (40-90%)<br>- no bumping (100%) | |

*FIG. 17*

| Type of profile | Diagram | Tension curve | Note |
|---|---|---|---|
| Circular R=cnst | | | |
| Variable radius | | | Progressivity can be increased |
| Multiple radiuses | | | Makes it possible to limit the overall dimensions |
| Secondary profile | | | Local profile (r<< R main profile). Single or repeated. Makes it possible to modify the behavior of the blade when the forming of the main profile is completed. For instance, the "stop" effect at the end of the travel can be reduced. |

FIG. 18

CYCLE-TYPE VEHICLE SUSPENSION PROVIDED WITH A RESILIENT ELEMENT FOR MAKING IT POSSIBLE TO OBTAIN AN OPTIMAL STATIC COMPRESSION CURVE, AND OPTIMIZED RESILIENT ELEMENT FOR SUCH SUSPENSION

CROSS-REFERENCE TO RELATED APPLICATIONS

This application is a national phase entry under 35 U.S.C. § 371 of International Patent Application PCT/FR2016/051560, filed Jun. 24, 2016, designating the United States of America and published as International Patent Publication WO 2016/207570 A2 on Dec. 29, 2016, which claims the benefit under Article 8 of the Patent Cooperation Treaty to French Patent Application Serial No. 1555850, filed Jun. 25, 2015.

TECHNICAL FIELD

The technical field of the disclosure is that of vehicle suspensions, specifically, that of cycle suspensions such as those intended to be mounted on the cycle steering wheel, and/or mounted on the cycle rear wheel.

BACKGROUND

Vehicle and, specifically, cycle suspensions are used for smoothing the irregularities of the surface that the vehicle travels on by reducing the impact on the vehicle, by avoiding mechanical fatigue and excessive wear, by maintaining the contact between the wheels and the ground in spite of the irregularities thereof, and by improving the ride quality.

A suspension necessarily consists of an energy-dissipating system ensuring the damping of shocks, conventionally provided by hydraulic lamination or mechanical friction, and a resilient system opposing the motion of the wheel and providing the return thereof to the balance point.

The resilient system must not only make it possible to weakly oppose the movement of the wheel around its balance position in order to ensure high sensitivity to small shocks (filtration of vibration) but also be able to strongly oppose major shocks so as to avoid the phenomenon of bumping, i.e., the suspension being stopped and thus no longer playing its role. The visualization of the force (in N) of the resilient system as opposed to the displacement of the wheel in the absence of dissipation of energy (i.e., without considering the energy-dissipating system) is called a static compression curve (or tension in the case of a "stretched" resilient system). This is called the static behavior of the suspension.

According to the above, an optimum static compression curve must have more or less linear, progressive or regressive portions in order to ensure the desired behavior in the available range of displacement of the wheel, which is referred to as "travel."

Conventional resilient systems employ bending springs (coil spring or bending blade) or compressively biased air springs. Bending springs have an almost linear static behavior, which generates bumping problems. Compressively biased air springs have an exponential static behavior, which prevents optimization throughout the entire available range of travel.

In any case, mechanical elements (typically a connecting rod/rocker assembly) have to be added or different resilient members have to be combined in order to obtain a satisfactory compression curve. Adding these parts results in an increase in the weight of the suspension, a greater number of parts and a greater complexity, which affects the reliability of the assembly and makes its implementation difficult.

French Patent FR3004415 thus provides for a suspension with a deformable quadrilateral, provided with an independent damper linked to a stress transfer part called a rocker, itself connected to the yoke via a linking part such as a connecting rod.

Such mounting with the various additional connecting parts makes it possible to improve the progressivity of the compression curve of the damper to move toward an optimal compression curve.

However, adding so many extra parts (including connecting rods/rocker and the means for the connection thereof) results in excessive weight, reduced reliability, reduced service life, increased overall dimensions.

The resilient elements conventionally used, which do not make it possible to obtain an optimum compression/tension curve, are:
- coil springs or leaf springs, which undergo a mechanical displacement corresponding to a macroscopic compression (they switch from a resting state in which their ends are furthest, and corresponding to an initial not biased state of the suspension, to an active state in which their ends are elastically moved closer to each other, an active state that coincides with the compression of the suspension) and that locally undergo, at each point, direct bending stresses.

Such resilient elements are used in flexion only and thus always have the same stiffness (in case of a small deformation), which generates a non-optimal linear behavior and then give linear compression curves and thus free of the changes in the above optimum curve,
- the air springs, the resilient element of which ensures the resilient function (air) is still used in compression, have the characteristic of generating an exponential compression curve, and which, by nature, are only slightly sensitive at the beginning of the stroke, because of the air pressure that is exerted on the seals. In addition, these elements consist of a large number of parts, some of which are moving (friction), require frequent maintenance and have reliability failures (leakage, friction, clearance, wear); and
- the elastomers, foams and other soft materials that must be integrated into a mechanical assembly, enable a very limited travel, and define a non-optimal compression curve.

BRIEF SUMMARY

This disclosure provides a suspension system that avoids drawbacks of the prior art and makes it possible to define a compression curve as close as possible to an ideal or optimal curve, without raising excessive weight, reliability, service life or overall dimensions issues.

The disclosure solves such problem by providing for a suspension system for a vehicle wheel comprising:
- two relatively movable portions, such as two segments of a deformable quadrilateral of a cycle suspension, the motions of which depend on the displacement of the wheel (travel),
- a resilient blade that includes two means for mechanical connection to both relatively movable portions, respectively, and having a flexural resilience at least ten times greater than the tensile resilience, and being resiliently deformable between:

a resting state wherein the blade has an inwardly curved profile, and a maximally extended state wherein the blade has an elongate profile, the length of which corresponds to that of the neutral fiber of the blade, while passing through intermediate extension states wherein the blade has profiles that are less and less inwardly curved, with the suspension system being deformable between:

an initial state, wherein the relatively movable portions are in a close configuration and the blade is in the inwardly curved resting state, and a compressed state, wherein the relatively movable portions are in a separated configuration and bias the blade, via the means for the connection thereof, into an extended state.

Thus, the suspension according to the disclosure biases the resilient means (the flexible blade) in a way that is different from the way it is biased in conventional suspensions in order to create a gradual transfer of bending bias with a low stiffness to a tensile load with a high stiffness. The deformation of this resilient means is, of course, an elastic deformation but the stiffness of the resilient means changes according to the intensity of the bias and the behavior curve is then not linear, even when no additional element has been added. In other words, the resilient element of the suspension according to the disclosure is so selected that it will not only undergo bending stresses over the entire range of bias, but an evolution of such stresses when the bias increases, from bending stresses for low intensity bias, to tensile stresses for high intensity bias and, therefore, a non-linear response with regard to stiffness. Such mechanism perfectly operates in the case of an initially curved blade that is stretched/drawn.

The device according to the disclosure may additionally have one and/or the other of the following characteristics:

the compressed state of the system comprises a maximally compressed state, wherein the relatively movable portions are in a maximally separated configuration and bias the blade via the connection means thereof into a maximum extended state.

the connection means each have at least one degree of freedom in rotation along an axis perpendicular to the mid-plane of the blade.

the connection means each have only one degree of freedom in rotation along an axis perpendicular to the mid-plane of the blade.

the blade is made of a composite material comprising fibers forming a closed loop surrounding inserts forming the means for connection to the relatively movable portions.

the profile of the blade has at least two opposite directions of curvature.

the profile of the blade has only one direction of curvature.

the profile of the blade has a radius of curvature that is not constant.

the profile of the blade has a thickness that is not constant.

the blade has at least one area cumulatively extending over less than 10% of the length, and having a stiffness at least 10% higher than the average stiffness in the other areas.

the blade has a profile defined by the combination of a main profile having at least one radius of curvature R1 and a secondary profile having a radius of curvature R2 smaller than half the radius of curvature R1.

the blade is symmetrical relative to the mid-plane.

the movable portions are provided on a deformable quadrilateral.

the movable portions are provided on a deformable quadrilateral comprising four pivots, with the means for connecting the blade with two relatively movable portions of the suspension comprising at least one pivot of the quadrilateral and/or at least one pivot mounted on one extension of one of the segments of the quadrilateral.

the movable portions are provided on a cycle frame triangle and a swinging arm connected through a pivot to such triangle and to the axis of rotation of one wheel of the cycle, with the means for connecting the blade to two relatively movable portions of the suspension comprising at least one additional pivot C, which coincides with one of the vertices of the triangle or has been added on one of the segments of the triangle and/or at least one pivot mounted on the swinging arm or on one extension of the swinging arm.

the ends of the blade are mechanically connected to two relatively movable portions of a damping device, respectively.

The disclosure also relates to the blade of the above suspension system.

BRIEF DESCRIPTION OF THE DRAWINGS

Other objects, characteristics and advantages of this disclosure will become apparent upon reading the following detailed description, while referring to the figures, in which:

FIG. 1 shows a diagram schematically illustrating the compression/tension curves obtained for a coil spring or a bent blade (a curve shown by solid squares), an air spring (a curve shown by circles) and one embodiment of a stretched blade according to the disclosure (a curve shown by crosses);

FIG. 2 shows the stretched composite blade used within the suspension according to the disclosure, according to a first embodiment wherein such blade comprises two different radiuses of curvature, and illustrating the means for connecting such blade to the suspension parts that are separated from one another upon compression of the suspension, which consist, in the example shown, of metallic inserts;

FIG. 3 shows a perspective view of the blade edge according to the disclosure, and reveals a varying thickness of the blade, according to a second possible embodiment;

Figure 4:
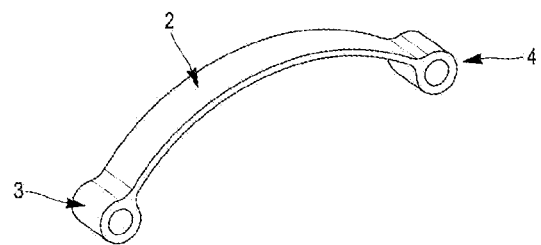
FIGS. 4 to 9 show different views of a blade according to a third embodiment of the disclosure.
Figure 5:
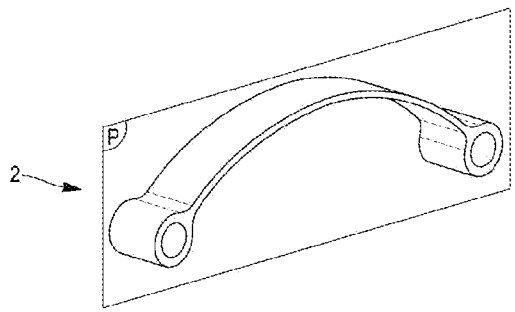
Figure 6:
Figure 7:
Figure 8:
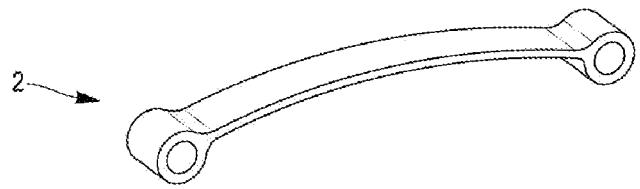
Figure 9:
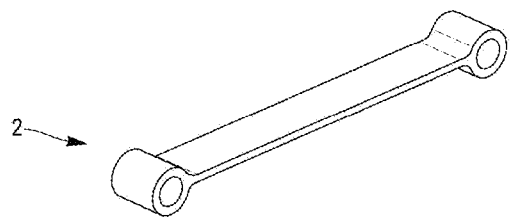
Figure 10:
Figure 11A:
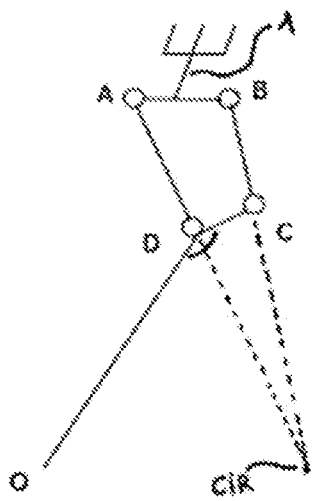
Figure 11B:
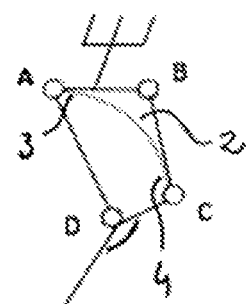
Figure 11C:
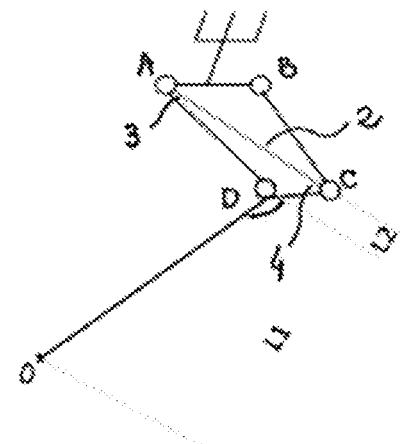
Figure 13A:
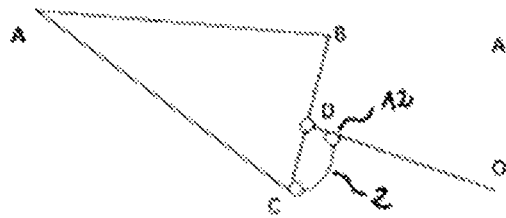
Figure 13B:
Figure 16A:
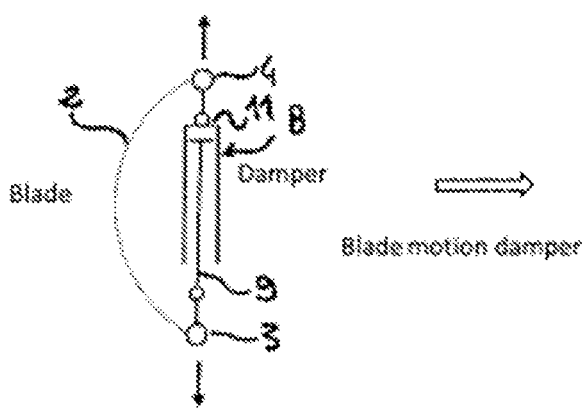
Figure 16B:
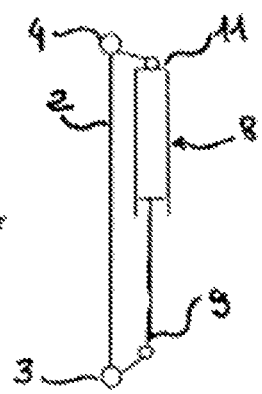

a top three-quarter view in perspective of the composite blade in the rest state (FIG. 4);

a view similar to that of FIG. 4 and showing the mid-plane of the blade (FIG. 5);

a sectional view of the blade along the mid-plane (FIG. 6);

a top view of the blade in the resting state (FIG. 7);

a top three-quarter view in perspective of the composite blade in an intermediate extension state (FIG. 8);

a top three-quarter view in perspective of the composite blade in the maximally extended state wherein the spacing has the same length as the length of the neutral fiber of the blade (FIG. 9);

FIG. 10 shows a schematic view of a composite blade according to the disclosure used in the following figures:

FIGS. 11A, 11B, 11C; 12A, 12B; 13A, 13B; 14A, 14B; 15A, and 15B schematically show the integration of the composite blade according to the disclosure according to five possible configurations within a front suspension of a cycle (FIGS. 11A, 11B, 11C; 12A, and 12B) and within a rear suspension of a cycle (FIGS. 13A, 13B; 14A, 14B; 15A, and 15B);

FIGS. 16A and 16B schematically show the association of the flexible blade of the suspension according to the disclosure with a damper;

FIG. 17 is a table illustrating different types of resilient elements and their advantages and disadvantages; and FIG. 18 is a table illustrating different types of profiles for blades as described herein, their diagrams, and tension curves.

DETAILED DESCRIPTION

As shown in FIG. 11B, the disclosure relates to a suspension for a vehicle (a cycle in the examples shown) provided with a deformable blade stretched and biased between two points of the suspension separated from one another upon compression of the suspension, in order to define a compression curve close to an optimal compression/tension curve.

In the example shown in FIGS. 11A, 11B, 11C; 12A, and 12B, the front of the bicycle is on the left and the suspension consists of four elements connected together by four pivots A, B, C and D.

The four elements define:
the upper plate AB: connected to the frame via the steering tube 1
the lower arm ODC
the upper arm AD
the connecting rod BC In addition, such suspension includes the axis of rotation of the front wheel O.

The pivots A and B of the steering tube 1 are positioned on either side of the axis of the pivot connection between the steering tube 1 and the cycle frame (not shown).

The positioning of such pivots makes it possible for such a suspension to be of the deformable quadrilateral type (i.e., which is not a parallelogram), with such deformable quadrilateral ideally being of the same type as the one disclosed in document EP 14 00 1362.

Such type of a suspension advantageously makes it possible to position the pivots A, B, C and D ideally, so that the position of the pitch point (CIR) of the yoke 3 relative to the steering tube 1, as defined by the intersection of the straight lines AD and CD, is at the back, relative to the cycle travelling direction, of the trajectory drawn by the axis of the front wheel. As a matter of fact, the deformable quadrilateral comprises the two opposite segments AD and BC, which slightly diverge one relative to another toward the upper plate AB, and the segment CD is biased relative to the upper plate AB, toward the axis of rotation of the front wheel.

According to the disclosure, for a suspension of this type to have an ideal compression curve, a deformable blade is mounted between any points of the suspension spaced from one another upon compression of the suspension, caused, for instance, by a shock received by the front wheel when the cycle is moving.

The position of the blade is selected according to the available volume space, the blade displacement delta, and the stress caused.

In the illustrated example, when comparing FIGS. 11A and 11C, the compression of the suspension as described above causes the rotation of the yoke around the pivot D (point O rises, point C rises more slowly than point D, and the quadrilateral ABCD deforms accordingly about the pivots A, B, C, D), a pivoting that results in the pivots A and C moving away from each other and the pivots B and D moving closer to each other.

To provide the suspension with an almost ideal behavior upon compression, the disclosure provides that a resilient element will be mounted between the two pivots, which move away from each other upon the compression of the suspension, A and C, the two ends of which are respectively mounted on both such pivots A and C and are stretched when both such pivots move away from each other.

A person skilled in the art will easily identify what suspension parts diverge from one another when the suspension is biased, from FIG. 11A or when comparing the figures before and after biasing of the suspension as shown in FIGS. 11B, 11C. In this case, in the configuration shown in FIGS. 11A, 11B, 11C, the two pivots A and C move away from one another. They have, therefore, been selected as the connection points with the ends of the blade.

The elastically deformable blade 2 is in an inwardly curved resting state when the suspension is not biased (FIG. 11B) and in an active state when the suspension is biased (compressed, in FIG. 11C).

The blade 2 is thus "stretched" by its ends when the suspension is biased.

Such blade 2, which is best visible in FIGS. 2 and 4 to 9, for instance, consists of a one-piece element, the flexural stiffness of which (a moment normal to the mid-plane) is much (10 times, 1,000 times, or even 10,000 times) smaller than its tensile stiffness (in the direction of the neutral fiber). An alternative solution to the one-piece structure of the blade consists in designing the same as an assembly of a blade and the two connecting elements thereof, with such alternative solution having the advantage of being less expensive than the one-piece blade.

The blade 2 has a central body, which is in the form of a thick strip, and ends in the form of a hollow cylinder segment, connected to the transverse end edges of the strip parallel to their axis of revolution. For instance, metallic connecting inserts 7 may be mounted in the hollow core of the ends.

More specifically, at rest (FIGS. 4 to 7), the blade 8 has a maximum curvature (the lowest radii of curvature), with the ends thereof (which coincide with the pivots A and C) being as close as possible to each other.

When a tensile force is exerted on its ends (FIG. 8), i.e., under the effect of the suspension compression, which causes separation of the pivots A and C from one another, which the ends of the blade are attached to, the flexural stresses (low stiffness) prevail and deform the blade by gradually lengthening the same (portions a and 1 of the curve bearing crosses in FIG. 1).

The apparent tensile stiffness of the blade is then directly related to its (very low) flexural stiffness.

Then, when the separating forces of its ends 3, 4 continue, the radius of curvature of the blade profile is increased, and the tensile forces also increase (portion y in FIG. 1) until the tensile stress/bending stress ratio tends to infinity (portion b in FIG. 1), since it is the neutral fiber of the blade that is biased (FIG. 9).

The apparent tensile stiffness of the blade then increases until it reaches its maximum tensile stiffness equal to the stiffness of the neutral fiber (much higher than the flexural stiffness, in portion b of FIG. 1).

According to the table shown in FIG. 17, the blade behavior thus makes it possible to obtain tensile curves, both very sensitive at the start of the motion and firm at the end thereof, and thus very close to an ideal tension/compression curve, unlike the other existing solutions, with the percentages mentioned representing the fork travel (0%=maximum expansion; 100%=maximum compression).

Alternative Embodiments of the Blade

An infinite number of curves can be obtained by changing the radius of curvature of the blade, such as those shown in FIG. 18.

Similarly, the variation in thickness directly affects the flexural strength and thus mainly changes the beginning of the curve. A simple local variation can be imagined (such as a reduced thickness 6, as illustrated in FIG. 3), whether multiple or gradual.

The width has little influence on bending but it is defined according to tensile strength criteria. A variation in width can thus be used to compensate, for example, a local reduction in thickness, in order to maintain the same tensile behavior.

If a (carbon, glass, etc.) fiber-based composite is used, it is desired to keep the same number of fibers over the whole blade length so as not to interrupt same. The same cross-sectional area (mm$^2$) may be maintained over the entire blade, which requires an increase in the width together with a reduction in thickness.

Not to affect the mechanical strength of the fibers and thus not to break the same, these are continuously wrapped around metal inserts 7 shown in FIG. 2, which are used as means for connecting the ends 3, 4 of the blade and the suspension portions, which move away from each other upon compression of the suspension.

The inserts are either directly the connecting pins or the supports/connectors thereof.

In addition, since the material does not work in the same manner through the thickness of the blade, a "sandwich" design has advantageously been proposed:
  the neutral fiber works in tension only. It does not affect the flexural behavior. The material may be a fine fiber having a very high tensile strength (such as high-modulus carbon).
  the surface area is the one that mostly affects the bending characteristics. The material must have a good resilience and possibly a good impact strength, such as a high performance polymer, such as aromatic polyamides.
  the intermediate area may be submitted to complex stresses according to the design of the blade. This area may participate in the dissipation of energy (foams, elastomer, etc.) and make it possible to filter the vibrations.
Another sandwich design can be proposed as follows:
a core without fiber made of "soft"/resilient material, for instance, elastomer.
fibers only on the surface. The surfaces would then provide the tensile strength. They could be relatively rigid.
Upon bending, the opposite surfaces of the blade would move toward one another and would crush the soft material of the core. The compressive reaction of the core would then tend to keep the blade in its original form.

In order to multiply (or create) a damping effect in the suspension according to the disclosure, a conventional damper may be associated with the blade in accordance with FIGS. 16A and 16B.

The blade is a resilient element that, by definition, deforms and returns to its initial position, but does not act as a damper. This means that it does not dissipate/absorb energy (except in the case of the above special sandwich design).

A conventional (hydraulic or air) damper 8 thus may be associated with the blade in the suspension frame. If such an association is not a problem, the damper 8 can be integrated into the blade structure so as to further reduce the overall dimensions and the number of parts thereof required according to the diagram as shown in FIGS. 16A and 16B. The ends 3, 4 of the blade 2 are connected when moving respectively with the end of the piston rod 9 and the rear of the bottom wall of the tube 1 wherein the piston moves.

A composite blade having either one of the aforementioned variable profile, thickness, width, whether or not associated with a damper, may be incorporated into a vehicle front suspension according to FIGS. 11A to 12B and/or a rear suspension according to FIGS. 13A to 15B.

Alternative Mounting of the Blade within the Suspension

Figure 12A:
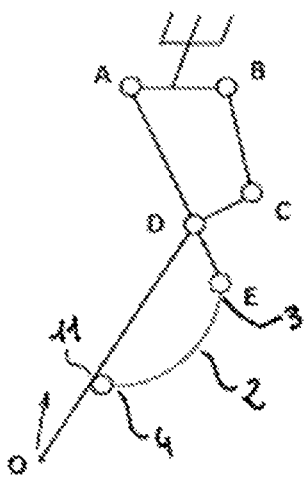
Figure 12B:
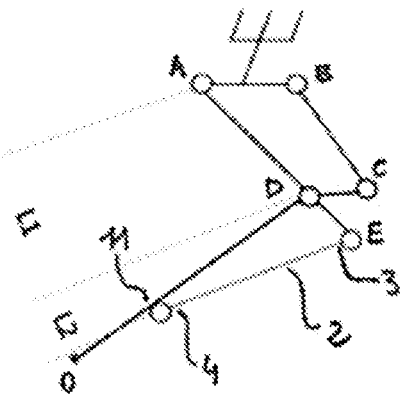

Unlike FIGS. 11A to 11C in which the blade is integrated in the quadrilateral in a position that could be called a high position, according to the example shown in FIGS. 12A and 12B, the blade is placed in a "low position."

For this purpose, the ends 3, 4 of the blade are respectively mounted on an additional pivot E positioned at the end E of an arm DE, which extends one of the quadrilateral segments (in this case the upper arm AD) and on an additional pivot 11 positioned on the lower arm OD. When the suspension is biased and the end O of the lower arm goes up, when the lower arm OD pivots, and the extended upper arm ADE rotates around the pivot D, the blade 2, which initially was in the curved rest state (FIG. 12A), has its ends stretched because the end E of the extension of the upper arm AD, and the lower arm OD (FIG. 12B) move away from each other.

The advantage of this low configuration of the blade with respect to the previous one, is to manage the length of the extension DE so as to reduce the stresses (lever arm effect L2/L1): the blade receives the stresses applied to the lower arm and limits the bending thereof.

Unlike FIGS. 11A to 12B, in which the blade is positioned within the front suspension of the cycle, FIGS. 13A to 15B show the blade placed within a rear suspension of a cycle.

In this case, the suspension is integrated in a triangle ABC of a mountain bike or that of the frame of a motorcycle, with such triangle being connected to the axis of the rear wheel O by a swinging arm OD around a pivot D positioned on the rear segment BC of the triangle or any other stationary part of the frame.

The blade according to the disclosure can be mounted in any point away from one another in the structure of the suspension upon biasing (lifting of the axis of rotation O of the rear wheel and pivoting of the swinging arm OD about the pivot D), with the choice of its position depending on the available volume space, on the blade displacement delta, on the forces generated.

In the example of FIGS. 13A and 13B, the blade is interposed between a pivot C, which coincides with the lower apex of the triangle ABC or any other stationary part, and an additional pivot 12 attached to the swinging arm OD near the pivot D.

The advantages of this configuration are that it requires a low number of parts for the integration (only the additional pivot 12 and the pivot C), as well as the reliability of the blade.

Figure 14A:
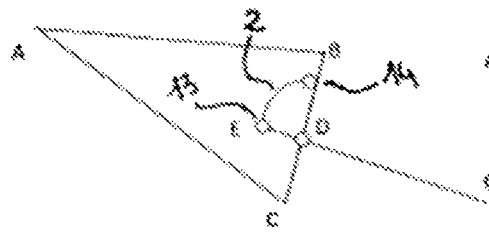
Figure 14B:
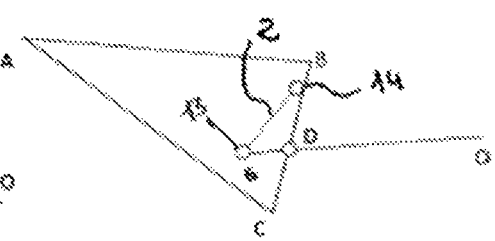

In the example of FIGS. 14A, 14B, an extension of the swinging arm OD within the triangle ABC is shown. The blade is interposed between a pivot 13, which coincides with the extension of the end DE, and an additional pivot 14 positioned on the segment DB, with the pivots 13 and 14 moving away from one another when the suspension is biased.

This configuration is advantageous in that it makes it possible to act on the length DE to reduce stress.

Figure 15A:
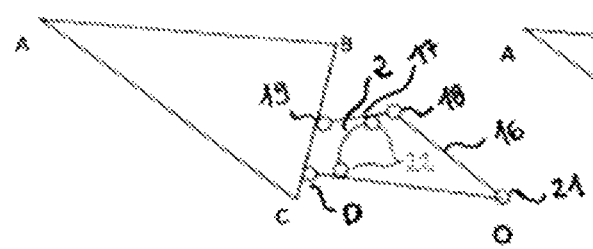
Figure 15B:
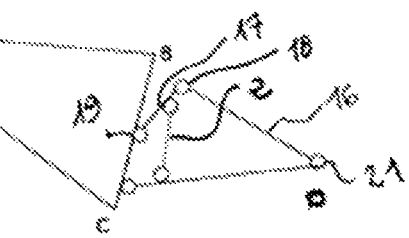

In the example of FIGS. 15A and 15B, the blade is in a "floating" position since no end is stationary relative to the vehicle frame. More precisely, in this example, two additional segments 16 and 17 are articulated in pairs about a pivot 18 by their contiguous ends, and respectively include an end hinged by means of a pivot 21 to the axis of rotation of the rear wheel. The pivots D, 21, 18, 19 form a deformable quadrilateral two rings OD and 17 of which diverge from each other when the suspension is biased. The blade according to the disclosure is mounted between those two segments, using pivots 22.

This configuration is often used with conventional resilient systems since it makes it possible to control the progressivity of compression, but it is not necessary when a stretched blade of the disclosure is used, but quite possible to modify the existing structures to a minimum while taking advantage of the improvements of the disclosure.

Other connections are available for the blade ends:

| Axis A/axis B | Advantages | Drawback |
|---|---|---|
| Knuckle/knuckle | No tensile stress can be transmitted to the blade Direct tension guaranteed | the blade is free about the axis AB: vibration, noise, interaction and premature wear of the connections |
| Pivot/knuckle | Isostatic solution => best mechanical solution | |
| Pivot/Pivot | simplest solution for the production and mounting Makes it possible to reduce the costs and simplifies design | May transmit undesirable torsional stresses. The stiffness of the supporting parts must be ensured and the blade must have adapted dimensions (L >> be) |

The use of a deformable blade, stretched when the suspension is biased provides various advantages including:
- the full integration of the blade within the quadrilateral or the cycle or vehicle triangle requiring a small number of parts, and thus increased reliability.
- the capacity to define a plurality of profiles for the tension curve and thereby to increase the performance, comfort and grip, by modifying the characteristics of the blade.
- the gain in space relative to other resilient means (optimization, design, integration).
- gain in mass (many parts less).
- best reliability (fewer parts, fewer connections).
- no maintenance, due to the absence of additional resilient parts like air springs or connecting rods, rocker, and thus the absence of pivot or any other connection to be maintained and, due to the absence of air spring, the absence of friction and thus wear and the absence of seal to be changed or maintained.
- no misadjustment possible.
- service life (no wear part, no friction).
- the capacity of changing the behavior of the suspension by simply exchanging blades (sensitivity, travel, stiffness, progressivity, type of use, etc.)

The invention claimed is:
1. A vehicle wheel suspension system, comprising:
two relatively movable portions;
a resilient blade that includes two elements for mechanical connection to each of the relatively movable portions, respectively, and having a flexural resilience at least 10 times greater than a tensile resilience of the blade, the blade being resiliently deformable between:
a resting state in which the blade has an inwardly curved profile, and
a maximally extended state in which the blade has an elongate profile, a length of which corresponds to a length of a neutral fiber of the blade,
while passing through intermediate extension states in which the blade has profiles that are less and less inwardly curved;
wherein the suspension system is deformable between:
an initial state in which the relatively movable portions are in a close configuration and the blade is in the resting state in which the blade has the inwardly curved profile, and
a compressed state in which the relatively movable portions are in a separated configuration and bias the blade, via the connection elements thereof, into an extended state; and
wherein the movable portions comprise a first portion and a second portion connected to one another, a first of the elements for mechanical connection is attached to the first portion, and a second of the elements for mechanical connection is attached to the second portion.

2. The vehicle wheel suspension system of claim 1, wherein the vehicle wheel suspension system comprises a cycle wheel suspension system.

3. The vehicle wheel suspension system of claim 1, wherein the compressed state of the suspension system comprises a maximally compressed state in which the second portion is in a maximally displaced configuration relative to the first portion, and the blade is biased, via the two elements for mechanical connection, into a maximum extended state.

4. The vehicle wheel suspension system of claim 1, wherein each of the two elements for mechanical connection have at least one degree of freedom in rotation about an axis perpendicular to a mid-plane of the blade.

5. The vehicle wheel suspension system of claim 1, wherein each of the two elements for mechanical connection have only one degree of freedom in rotation about an axis perpendicular to a mid-plane of the blade.

6. The vehicle wheel suspension system of claim 1, wherein the blade comprises a composite material including fibers forming a closed loop surrounding inserts forming the two elements for mechanical connection to the relatively movable portions.

7. The vehicle wheel suspension system of claim 1, wherein the profile of the blade has at least two opposite directions of curvature in the resting state.

8. The vehicle wheel suspension system of claim 1, wherein the profile of the blade has only one direction of curvature in the resting state.

9. The vehicle wheel suspension system of claim 1, wherein the profile of the blade has a radius of curvature that is not constant in the resting state.

10. The vehicle wheel suspension system of claim 1, wherein the profile of the blade has a thickness that is not constant.

11. The vehicle wheel suspension system of claim 1, wherein the blade has at least one area cumulatively extending over less than 10% of the length, and having a rigidity at least 10% higher than the average rigidity in other areas of the blade.

12. The vehicle wheel suspension system of claim 1, wherein the blade has a profile, in the resting state, defined by a combination of a main profile having at least one radius of curvature and a secondary profile having a radius of curvature smaller than half the at least one radius of curvature.

13. The vehicle wheel suspension system of claim 1, wherein the profile of the blade is symmetrical relative to a mid-plane.

14. The vehicle wheel suspension system of claim 1, wherein the first portion comprises a frame, and the first of the elements for mechanical connection coincides with a vertex of the frame, and the second of the elements for mechanical connection is mounted on the second portion or is mounted on an extension of the second portion.

15. The vehicle wheel suspension system of claim 1, wherein the ends of the blade are mechanically connected to two relatively movable portions of a damping device, respectively.

* * * * *